April 2, 1946.    R. HADEKEL    2,397,736
HYDRAULIC CONTROL SYSTEM
Filed Nov. 30, 1943
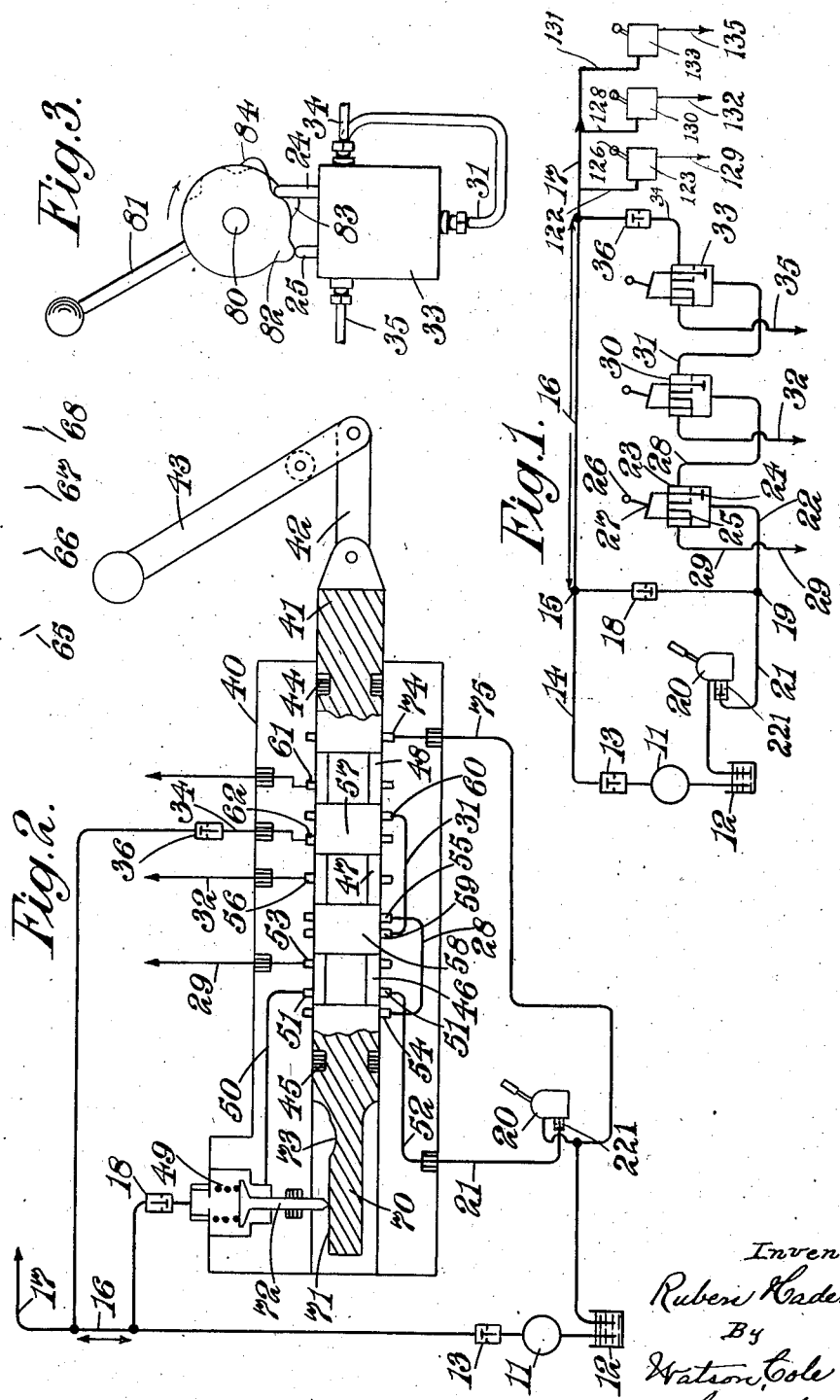

Patented Apr. 2, 1946

2,397,736

UNITED STATES PATENT OFFICE 2,397,736

HYDRAULIC CONTROL SYSTEM

Ruben Hadekel, Warrington, England, assignor to Aeronautical & Mechanical Investments Limited, a British company Application November 30, 1943, Serial No. 512,361
In Great Britain August 24, 1942

6 Claims. (Cl. 60—97)

This invention comprises improvements in or relating to hydraulic control systems.

It is usual in hydraulic distant-control systems such as those used for operating the various jacks and like pieces of apparatus on an aircraft, to provide a normal transmission line for carrying pressure from an engine-driven or other power-driven pump to the various pieces of apparatus and, separately from this, an emergency line which is usually capable of being supplied by a hand-pump so that if the normal transmission line is thrown out of action by becoming damaged, the apparatus, such for example as an undercarriage, may still be operated by the emergency hand-pump and the line attached thereto. The various arrangements embodying this principle which have hitherto been proposed are, however, subject to certain objections; not only the lines but the pumps are liable to become damaged and if the systems are quite separate the hand-pump cannot operate through the normal transmission line nor the power-pump through the emergency line, either of which methods of operation may become desirable in certain eventualities. It has been proposed to connect hand- and power-pumps to a common point in the circuit and to branch the normal and emergency lines (through valves) from this common point thus permitting either hand- or power-pumps to operate by the normal or emergency circuits but in this case damage to certain parts of the pipeline will render both pumps useless and the system is only satisfactory in those instances where there is an automatic tendency for the gear which is operated to return in such circumstances to a prearranged position, for example, for an undercarriage to extend itself ready for landing.

It has also been proposed to provide a selector valve to enable the hand-pump to operate at will either the emergency or the normal circuit, but this arrangement does not permit the power-pump to operate both circuits, nor does it provide for the operation of more than one emergency circuit.

Among the objects of the present invention are to provide circuits in which (a) any number of services can be operated under emergency by lines independent of the normal operating circuit, (b) the emergency hand-pump is capable of operating alternatively through the normal supply lines and (c) in the event of failure in the normal supply lines, the power-driven pump may operate at will through the emergency lines.

According to the present invention, in a system of hydraulic distant-control of the kind in which hydraulic pressure is conveyed from a source of pressure to apparatus operated thereby through transmission pipes, the apparatus being operated by appropriate valves under the control of an operator, there is provided the combination of a power-driven pump, an emergency pump, both pumps delivering through a non-return valve to a common point, a plurality of three-way valves, one of which is in series with said common point and serves to connect the delivery therefrom in one position of the valve to an emergency line and in the other position to a second of said three-way valves, said second three-way valve serving to deliver in one position thereof to another emergency line and in the other position to a further line connected (if desired through further three-way valve or valves) to a normal supply line.

In this way, the three-way valves are in series with one another. Any number of such valves may be provided from two valves upwards to correspond with the number of different pieces of apparatus which may need to be operated through emergency circuits. The normal line of course is connected to the normal selector valves by which the various pieces of apparatus are operated in normal use. Either the hand or the power pump can deliver through the three-way valves to the normal supply line when these valves are set over into their normal position where the emergency lines are disconnected. In the event of failure of any part of the normal supply line any piece of apparatus can be operated through an emergency line either by the power or by the hand pump upon throwing over the three-way valve which is connected to that piece of apparatus through its emergency line. Throwing over the valve in this way will automatically close the connection to the normal supply line and therefore a defect in it will not interfere with the operation. As the emergency lines are all separate from one another a defect in one will not affect the others.

In addition, if desired, there may be a by-pass from the power-pump to the normal line so that in ordinary operation the power-pump does not deliver through the three-way valves to the normal line. If such a by-pass is not provided the power-pump cannot operate any of the normal services unless all the three-way valves are in the normal position. On the other hand, if the by-pass line is provided the power-pump can operate the emergency lines only in the event that pipe failure in the normal lines is not of such a character as to cause the delivery of the power-pump to leak away through the by-pass.

Preferably, the power-pump delivers through a non-return valve to the point where the by-pass is branched from the connection which leads to the common point and there is a second non-return valve in the part of the delivery from the power-pump which extends from the by-pass to the common point.

One embodiment of the invention will now be described by way of example, reference being made to the accompanying drawing, in which—

Figure 1 is a diagram of a hydraulic distant-control system in accordance with the present invention.

Figure 2 is a diagram showing partly in section a specific form of combined selector valve embodying a number of three-way valves in its construction.

Figure 3 is a diagram of another construction.

Referring to Figure 1, the system comprises a power-pump 11 which draws from a sump 12 and delivers through a non-return valve 13 to a delivery line 14. At 15 the line 14 is connected on the one hand to a by-pass 16, and through the by-pass to a normal delivery line 17. The normal delivery line 17 is connected through a branch 122 and selector valve 123 controlled by handle 126 to a line 129. The line 129 will be taken to one of the pieces of apparatus (jacks etc.) to be operated by the hydraulic pressure fluid. A second branch 128 and selector valve 130 controls a line 132 to another piece of apparatus and a third branch 131 and selector valve 133 controls line 135 to a third piece of apparatus. This is in principle the usual distribution system from the power pump. The line 14 is also connected through a second non-return valve 18 to a point 19 which forms a common point of delivery. There is a hand-pump 20, also drawing from the sump 12 at a lower level than the pump 11, (or it may be from a separate tank) and delivering through the conventional non-return valve 221 and a line 21 to the "common point" 19. From here the line 22 proceeds to a three-way valve 23. The three-way valve 23 is shown as comprising two lift valve members 24, 25 either of which can be opened by operation of a lever 26 pivoted at 27 but it will be understood that any construction of three-way valve might be adopted as desired. If the lever 26 is thrown over into the right-hand position, as shown in the drawing, the lift-valve 24 is opened and the delivery is connected to the line 28 while the valve 25 is closed. If the operating lever 26 is thrown over into the left-hand position the connection to the line 28 is closed and a valve member 25 opens so as to afford delivery to an emergency line 29. The emergency line 29 is taken, in the same way as known emergency lines, to the apparatus operated by line 129 and forms an alternative channel of operation for this apparatus. In a similar way, there is in series with the three-way valve 23 another similar three-way valve 30 capable of connecting the line 28 either to a continuation line 31, or in the other position of the valve, to a second emergency line 32. The line 32 is taken to the same apparatus as normal supply line 132. The continuation line 31 extends to a third three-way valve 33 which affords connection in one position to a further continuation line 34 and in the other position to a third emergency line 35. The line 35 is taken to the same apparatus as line 135. The line 34 is connected through a non-return valve 36 to the normal circuit line 17.

Thus, if all the three-way valves are set over to the right as shown in the diagram so that the continuation lines 28, 31 and 34 are in communication with one another, the pump 20 can deliver through the pipe 14 and non-return valve 18 to the three-way valves, and by them through the continuation lines and the non-return valve 36 to the normal circuit. The provision of the by-pass 16 is optional. If it is not provided the normal circuit is supplied by the power-pump 11 through valve 18 and the three-way valves when these are all set over to the right as shown in the figure, in the same manner as that just described for hand pump 20. If the by-pass 16 is provided the normal circuit will receive its supply from pump 11 through the by-pass 16. Should the hand-pump 20 be brought into operation, however, the normal circuit will be supplied through the three-way valves as just described.

If any one of the normal circuit lines 129, 132, 135 from the selector valves to which the pipe 17 is connected should be put out of action, the corresponding piece of apparatus can be operated through the appropriate one of the emergency lines 29, 32, 35 by simply throwing over the three-way valve controlling that emergency line. If this is done either the power-pump or the hand-pump, whichever may be available, will supply the emergency line. If only one of the normal circuit lines is thrown out of operation there is nothing to prevent the power-pump from continuing to supply the other circuit lines by way of the by-pass line 16 if this latter is provided. The various normal and emergency lines are connected to various pieces of apparatus in the system. Thus for example, the lines 29 and 129 might be connected to the undercarriage circuit, the lines 32 and 132 to undercarriage flaps and the lines 35 and 135 to bomb doors. It will be evident that any number of three-way valves may be arranged in series in this manner as desired.

It will also be apparent that the system as shown in Figure 1 will only operate as desired if any valve or valves which are between the pumps and the emergency line which is to be used, are thrown over to the right; in other words, each of the valves must be properly set; if the valve 23 is thrown over to the left, the emergency line 29 will be in use and none of the other emergency lines can be operated. Various means may be arranged to interlock the three-way valves together to ensure that they are all properly set without undue attention.

For example, a selector valve 40 as shown in Figure 2 may be provided which embodies all the three-way valves in a single construction and operated by a single lever.

In Figure 2 the power-pump 11 and hand-pump 20 drawing from sump 12 are provided as before and the various parts are as far as possible given reference numerals which correspond to the similarly numbered parts in Figure 1.

The selector valve 40 comprises the fixed casing 40 and a sliding piston valve member 41 operated by a link 42 from a hand-lever 43. The piston valve member 41 is provided at its ends with packing rings 44, 45 and between the packing rings there are a number of grooves 46, 47, 48 which are capable of being brought into line with various ports in the casing 40. The delivery of the power-pump 11 through the non-return valve 18 passes through a valve chamber 49 hereinafter described, to a conduit 50 leading to a port 51. The delivery 21 of the hand-pump 20 is led through a conduit 52 to the port 51. Thus, the port 51 constitutes the "common point," hereinbefore referred to, to which both the pumps deliver. If the piston valve is in its extreme right-hand position, as shown in the drawing, with the hand-lever 43 thrown right over to the left, the "common point" 51 is connected through the reduced portion 46 of the valve with a port 53 connected to the emergency line 29. On the other hand, if the valve member 41 is moved to the left, the port 53 is closed and another port 54 is opened connected by continuation conduit 28 to another port 55. Thus, the two ports 53, 54 and the adjacent parts constitute the first three-way valve. Movement of the valve member 41 to open the port 54 also opens the port 55 by way of the second reduced portion 47 and serves to connect the pressure to the second emergency line 32 by way of a port 56. Further movement of the valve member 41 to the left will close the port 56, which will be obturated by a portion 57 of the valve member 41, but at the same time the portion 58 of the valve member will in this case move far enough to uncover a port 59 linked by continuation line 31 with another port 60. The opening of the port 59 coincides with the opening of the port 60 and the length of the reduced portion 46 is made sufficient to ensure that the ports 51 and 54 both remain open during this further movement of the valve. Therefore, in the new position, which is the third position of the valve, the "common point" 51 is connected by the continuation lines 28 and 31 to the groove 48 of the valve member 41 and thence by a port 61 to the third emergency line 35, the other emergency lines being closed by the obturation in this position of the ports 53 and 56.

Further movement of the lever 43 and valve member 41 will obturate the port 61 and connect the port 60 to a port 62 connected to line 34 and thence by the return valve 36 to the normal circuit 17 connected to normal supply lines 129, 132, 135 through selector valves as shown in Figure 1. The successive positions of the lever 43 are indicated on the drawing by the marks 65, 66, 67, 68 respectively, and if desired a scale provided with such marks may be affixed behind the lever and the lever may carry a pointer to move over the scale.

This construction therefore serves to ensure that all the three-way valves operate in the appropriate succession.

It will be observed that the valve member 41 carries an extension stem 70, the upper surface 71 of which is shaped as a cam. In the positions 65, 66, 67 of the lever 43 this cam serves to engage the lower end of the stem of a lift valve 72 located in the valve chamber 49 and to hold this valve open. The surface 71 has, however, a depression 73 at the position which corresponds with the position 68 of lever 43 and at this point the valve 72 is allowed by the depression 73 to close, thus cutting off connection of the delivery of the pump 11 with the piston valve member 41. In this position of the parts, therefore, the pump 11 can only deliver to the normal circuit through the by-pass 16 as the "common point" 51 is cut off by the closing of the valve 72. Should the hand-pump 20 be required, however, it can deliver to the normal circuit in the manner already described. The reason for the provision of the valve 72 is to prevent power-pump pressure from being continuously applied to the selector valve 41 and leading to leakage of the system. It will be appreciated that the hand-pump will generate pressure only when worked by the operator and it is therefore no objection that this pump is always connected to the valve.

A suitable drain groove 74 is provided around the stem of the valve member 41 and connected by a drain pipe 75 to the sump 12.

Referring now to Figure 3, this shows an alternative construction. A number of valves 33 are provided which in the figure are located in line one behind the other end which correspond to the valves 33, 30 and 23 of Figure 1. The stems of the valves 24, 25 (of valve 33) can be seen in Figure 3 projecting out of the valve casing 33 and the pipes 31, 34 and 35 are shown corresponding to the similarly numbered pipes in Figure 1. Above the valves 33, 30, 23 there extends an operating shaft 80 capable of being rocked by means of a handle 81. Above the valve 33 is a cam 82 on the shaft 80 and the cam engages the stems 24, 25 so that it is capable of rocking them over into the desired positions. Other cams 83, 84 are provided above the other valves and they are so located in relation to the cam 82 as to operate the valves in the proper sequence. It will be noted that the stems of valves 25 on the right are made longer than those of valves 24 so that when both valves are on the circular parts of the cam 82, 83, 84 the valve 25 is open and the valve 24 closed. The valve 24 is opened by the hump of its cam and vale 25 simultaneously allowed to close by the depressed part of the cam. The operation is as previously described.

I claim:

1. In a system of hydraulic distant-control of the kind described, the combination of a power-driven pump, an emergency pump, both pumps delivering through non-return valves to a common point, a plurality of three-way valves, one of which is in series with said common point and said pumps, and serves to connect the delivery therefrom in one position of the valve to an emergency line leading to one piece of apparatus to be operated and in the other position to a second of said three-way valves, said second three-way valve serving to deliver in one position thereof to another emergency line leading to another piece of apparatus to be operated and in the other position to a further line connected to a normal supply line, the normal supply line having branches and control valves thereon leading to the said pieces of apparatus to be operated.

2. A system of hydraulic distant-control as claimed in claim 1, wherein a by-pass is provided from the power-pump to the normal supply line for the purpose described.

3. A system of hydraulic distant control of the kind described comprising in combination a power-driven pump, an emergency pump, both pumps delivering through non-return valves to a common point, a plurality of three-way valves, each of them constituted by different sections of a selector control valve so constructed that the valves are operated seriatim in the proper order in a series of positions of the selector control valve, one of which three-way valves is in series with said common point and said pumps and serves to connect the delivery therefrom in one position of the valve to an emergency line leading to one piece of apparatus to be operated and in the other position to a second of said three-way valves, said second three-way valve serving to deliver in one position thereof to another emergency line leading to another piece of apparatus to be operated and in the other position to a further line connected to a normal supply line, the normal supply line having branches and control valves thereon leading to the said pieces of apparatus to be operated.

4. A system of hydraulic distant-control as claimed in claim 3, wherein the selector valve comprises a piston valve member movable to a series of positions corresponding to the various required positions of the three-way valves and the three-way valves are constituted by appropriately arranged ports in the casing through which the piston valve member slides, cooperating with grooves or their equivalent in the piston valve member, and wherein a non-return valve is provided between the delivery of the power-pump and the piston valve casing which non-return valve is capable of being opened against the pressure by means of a cam on the piston valve member.

5. A system of hydraulic distant-control as claimed in claim 3, wherein the selector valve comprises a piston valve member movable to a series of positions corresponding to the various required positions of the three-way valves and the three-way valves are constituted by appropriately arranged ports in the casing through which the piston valve member slides, co-operating with grooves or their equivalent in the piston valve member.

6. A hydraulic distant-control system as claimed in claim 1, comprising a series of separate three-way valves operated from a common control member through cams so arranged as to operate the said valves in the appropriate order.

RUBEN HADEKEL.